INVENTOR.
ANDRIANUS VAN DIJK
BY
Wenderoth, Lind + Ponack
Attys.

United States Patent Office 3,045,614
Patented July 24, 1962

3,045,614
GAS-HEATED DISCONTINUOUS FURNACE PARTICULARLY ADAPTED TO THE BAKING OF BREAD
Adrianus van Dijk, The Hague, Netherlands, assignor to the State of the Netherlands, for the purposes of this application represented by The Board of Directors of the State Gas Concern, The Hague, Netherlands, a corporation of the Netherlands
Filed May 23, 1960, Ser. No. 31,076
Claims priority, application Netherlands May 23, 1959
3 Claims. (Cl. 107—55)

The present invention relates to a discontinuous furnace, particularly adapted to the baking of bread.

Especially in bakeries which are not equipped with continuous furnaces, such as bread factories, there is a need for a discontinuous furnace of high efficiency, and admitting of easy regulation to a constant temperature level in spite of frequent charges and discharges, which in the ordinary way cause great differences in temperature.

In addition to this such a furnace must be simple and should, therefore, not be equipped with an intricate regulating apparatus, while to promote clean working gas heating is to be preferred.

To this end a discontinuous furnace has been proposed, provided wtih a least one baking space, which is bounded at its lower as well as at its upper side by a radiator case, which is heated on the inside by means of forced circulation of the combustion gases produced by one or more gas burners, so that the articles to be baked are heated indirectly.

It is an object of the present invention to provide a discontinuous furnace which distinguishes itself from said furnace in that one or more gas burners are disposed in the radiator cases and in that the radiator case situated below the baking space has a perforated grid-like covering plate, while the cases as well as the baking space are provided with supply and discharge openings in the side walls, through which the combustion gases can circulate through the cases and the baking space.

Preferably the construction of the furnace is such as to have the circulation in the baking spaces and in the radiator cases run in the same direction to which end all the openings on one side of the furnace are connected to a common discharge channel and all the openings on the other side to a common supply channel, which channels communicate within the outer mantle of the furnace by a ventilator.

According to the present invention all the openings may be provided with regulating elements for adjusting the size of the openings and for closing them if necessary, in order to have control of the circulation.

According to the invention the regulating elements of the openings in the baking space can be coupled with the door of the furnace in such way that the openings are closed when the door is opened. By this arrangement the loss of heat during the charging and the discharging of the furnace is restricted and the circulating combustion gases are not mixed with the cold air entering at the open door.

According to the invention the openings in the side walls of the baking spaces are preferably disposed near the top of the baking spaces, because this permits the most effective regulation for keeping the temperature in the baking space constant.

By arranging the burner pipes in a direction such that they extend from the back to the front of the furnace it is possible to maintain a constant temperature level, over its entire length, besides which said arrangement also has the advantage that the pipes may easily be extracted or exchanged through inspection holes in the front wall or rear wall, without taking down the regulating elements of the burners at the rear of the furnace. In addition to this the arrangement offers the advantage of allowing the arrangement of several furnaces beside each other, because the side walls of the outer mantle are perfectly smooth.

The invention is hereinafter further described with the aid of a drawing showing an embodiment of a charging furnace according to the invention, in which.

Figure 1:
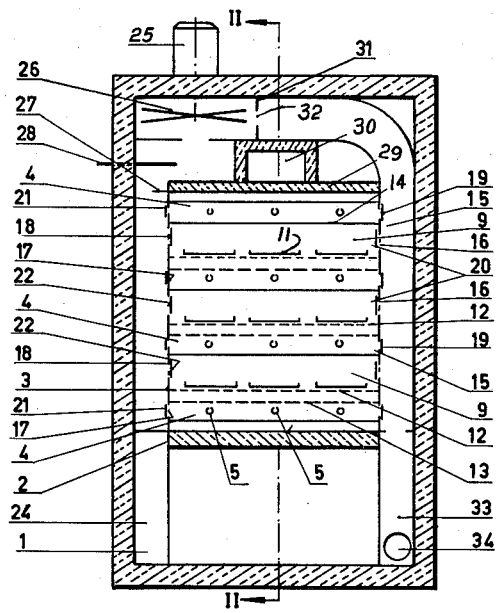
FIG. 1 is a transverse cross-section of the furnace on the line I—I in FIGURE 2.
Figure 2:
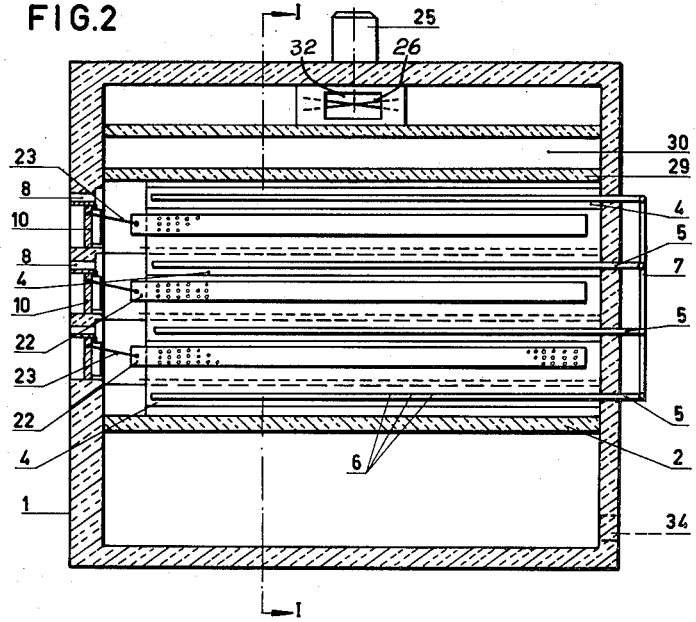
FIG. 2 is a longitudinal cross-section of the furnace on the line II—II in FIGURE 1.

An inner frame 3 of sheet metal is positioned in an insulated outer mantle 1 on an insulated floor 2. Said inner frame 3 is provided with four radiator cases 4, in each of which three burner pipes 5 are arranged in the direction from the rear to the front of the furnace. The pipes 5 are provided with openings 6 for the gas flames distributed over their lengths. Behind the furnace the burner pipes are connected to a distributing conduit 7 which is provided with regulating elements for gas and air, in order to obtain a good regulation of the flames.

To facilitate the cleaning and exchanging of the burner pipes 5, openings 8 closed with sight glasses are provided in the mantle 1 at the front side of the furnace, through which openings the long pipes 5 can be pulled out through the front.

Between the four burner cases are three baking spaces 9 into which spaces baking tins or plates 11 can be placed on longitudinal grids 12.

The radiator cases 4, lying under a baking space 9, are covered by a perforated covering plate 13, through which the combustion gases can enter the baking space 9 lying over them.

Naturally the grid 12 lies at some distance from the plate 13 in order that the combustion gases may be able to circulate about the articles to be baked present in the tins 11 or on the plates. The top of the baking space 9 is formed by the closed bottom 14 of the radiator case lying over it.

The heating of the goods to be baked is effected from the upper side by means of radiation from the top, i.e. indirectly, and from the lower side mainly through the convection of the combustion gases, i.e. directly.

However, this method of heating in itself is not sufficient to obtain an even temperature in the baking space 9 and for this purpose the side walls of the inner portion of the furnace, i.e. the radiator cases 4 as well as the baking spaces 9, are provided with rows of openings communicating with the spaces between the inner frame 3 and the outer mantle 1.

In the right side of the furnace are disposed openings 15 in the radiator cases 4 and openings 16 in the baking spaces 9 for the supply of combustion gases, and at the left side openings 17 in the radiator cases 4 and openings 18 in the baking spaces 9 for the discharge of the combustion gases.

The openings 15 and 17 in the radiator cases are disposed about half-way up, while the openings 16 and 18 in the baking spaces are disposed closer to the top of the baking spaces, in order that the combustion gases may be able to rush over the articles to be baked and that too strong a radiation from the top may be avoided. In addition to this, the regulation of the circulation may in this manner be controlled more easily.

The radiator cases as well as the baking spaces are provided with regulating elements, which are slidably supported on the side walls. The elements are in the form of sliding valves 19, 20, 21 and 22, and contain rows of openings matching the passages 15, 16, 17 and 18 respectively, in order that by an adjustment of said valves the passages can be closed or opened to an extent such that a predetermined flow of gas can be obtained.

The sliding valves 20 and 22 of the baking space 9 are coupled to the furnace doors 10 by means of rods 23, by which the sliding valves are closed when the door is opened. By adjusting the length of the rods 23 the width of the openings 16 and 18 is regulable.

The valves 19 and 21 are adjusted only once for a certain method of operation and are not shifted again except for a different method of operation.

The space in the outer mantle 1 at the left side of the inner frame 3 forms a channel 24 serving as a discharge channel for the combustion gases and leading to a ventilator 26 which is driven by a motor 25. In addition to this a regulating plate 27 and also a spraying conduit 28 are provided in the channel 24, ahead of the ventilator in the channel 24, in order that water vapor may be added to the combustion gases. A hot water container 30 is disposed on the insulated covering plate 29 of the inner frame 3 and a partition 31 is provided between the left and right parts of the furnace. The ventilator 26 propels the combustion gases through the opening 32 in the partition 31 to the right half of the furnace in a channel 33 between the inner frame 3 and the outer mantle 1. From said channel 33 the combustion gases can, through the supply openings 15 and 16, enter the radiator cases 4 and the baking spaces 9 for circulation, but part of the gases is discharged at the bottom of the outer mantle 1 through a chimney flue 34.

By the combustion gases being circulated by the channels 24 and 33, through the ventilator 26, transversely to the radiator cases 4 and the baking spaces 9, and by its being possible to achieve a complete control of the circulation by means of the adjustable sliding valves for the openings, a constant temperature level is realized over the breadth of the baking spaces.

The disturbance, which would normally take place when an oven door 10 is opened, in this furnace is largely compensated by the sliding valves 20 and 22 of the baking spaces 9 being coupled to the oven door 10 and by the circulation through the baking space 9 being stopped at the opening of said door. The capacity of the ventilator 26 being constant, the draught through the openings 17 of the radiator cases 4 will increase due to the openings 16 and 18 being closed and will cause an acceleration of the circulation through the radiator case, causing the volume of combustion gases, which otherwise enters the baking space 9 through the perforated bottom plate 13 to be discharged through the openings 17. Because this gas volume is fed back again through the openings 15, practically no air of low temperature will be sucked from outside through the door into the oven, and the temperature level will be maintained.

A baking space may be put out of operation in a simple manner by not only closing the openings 16 and 18 with the sliding valves 20 and 22 with the aid of the rods 23 or by means of separate rods, but by at the same time disconnecting the burners belonging to that particular baking space.

Because the burning of the gas and the whole of the circulation take place within the mantle 1 and because said mantle is insulated the radiation losses are small, while in addition to this the highest temperature zones, i.e. the radiator cases with the burners, are situated in the center of the furnace and are surrounded by lower temperature zones, i.e. the channels.

The furnace according to the invention, in addition to a great accuracy in the uniform temperature adjustment, has a low heat storage capacity and, therefore, a very slight accumulation, by which disposition a high efficiency can be achieved and a low heat input will suffice.

Said disposition at the same time makes it possible to change the furnace more quickly from one temperature level to the other without symptoms of inertia presenting themselves.

More particularly when working with an oven with decreasing temperature work can be carried on practically without any loss of time and the whole of a baking space can be quickly and sharply adjusted to and kept at the lower temperature required.

I claim:

1. A bake oven particularly adapted to the baking of bread, comprising an outer mantle having at least one baking space therein, a lower radiator case underneath said baking space, said lower radiator case having an open grid-like separating wall between said space and said lower radiator case and defining the bottom of said baking space, an upper radiator case over said baking space and defining the top of said baking space, a plurality of gas burner pipes parallel to each other and extending into said radiator cases from the rear wall of said mantle to a point adjacent the front wall of said mantle, said mantle having a vertical common discharge channel therein on one side of said baking space and said radiator cases, and a vertical common supply channel therein on the other side of said baking space and said radiator cases, a duct within said outer mantle connecting said channels and having a blower therein, a passageway from one of said channels to a flue discharge stack, side walls defining the sides of said baking space, said side walls having horizontal rows of spaced passages extending therethrough near the top of said baking space, said spaced passages providing communication between the interior of the baking space and said vertical channels, regulating elements slidably supported on said baking space side walls and having openings therein matching the passages in said sidewalls, said radiator cases having sidewalls with horizontal rows of spaced passages extending therethrough and providing communication between the interior of said cases and said vertical channels, further regulating elements slidably supported on said radiator case side walls and having openings matching the passages in said radiator case side walls.

2. A bake oven as claimed in claim 1 in which there are at least two baking spaces, the lower radiator case underneath the upper baking space being the upper radiator case over the lower baking space.

3. A bake oven as claimed in claim 1, further comprising a door in the front wall of the outer mantle giving access to a baking space, a lever system connecting said door to the regulating elements slidably supported on the side walls of said baking space, whereby the openings in said elements are moved out of alignment with the passages in said side walls when the door is opened.

References Cited in the file of this patent

UNITED STATES PATENTS

| | | |
|---|---|---|
| 2,290,136 | Agnew et al. | July 14, 1942 |
| 2,597,627 | Fader et al. | May 20, 1952 |
| 2,735,381 | Breed | Feb. 21, 1956 |
| 2,792,793 | Agnew | May 21, 1957 |